(No Model.)
J. B. GRUETER & O. JACKSON.
SPROCKET WHEEL AND CHAIN.
No. 511,137.            Patented Dec. 19, 1893.
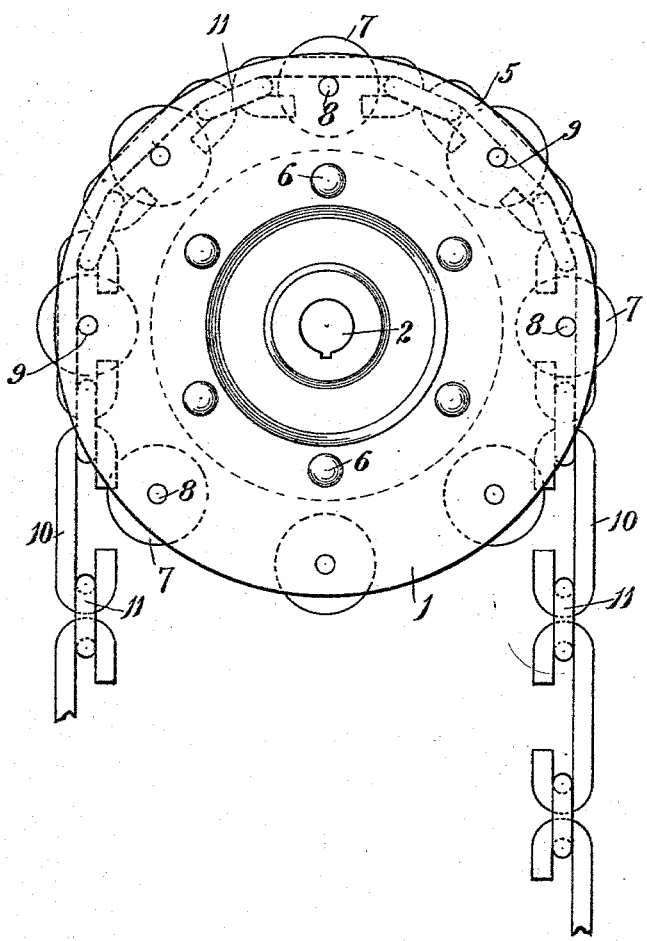
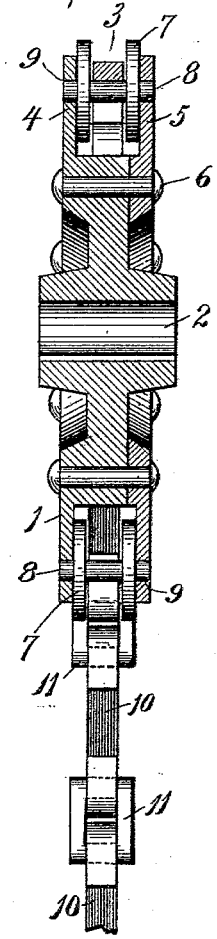
Witnesses.
O. H. Keeney,
Anna O. Faust.
Inventors.
John B. Grueter
Oswald Jackson
By Benedict & Morsell
Attorneys.

UNITED STATES PATENT OFFICE.

JOHN B. GRUETER AND OSWALD JACKSON, OF CARROLLTON, ILLINOIS.

SPROCKET WHEEL AND CHAIN.

SPECIFICATION forming part of Letters Patent No. 511,137, dated December 19, 1893.

Application filed June 9, 1893. Serial No. 477,124. (No model.)

*To all whom it may concern:*

Be it known that we, JOHN B. GRUETER and OSWALD JACKSON, both of Carrollton, in the county of Greene, State of Illinois, have invented certain new and useful Improvements in Sprocket Wheels and Chains; and we do hereby declare that the following is a full and exact description thereof, reference being had to the accompanying drawings, and to the figures of reference marked thereon, making a part of this specification.

Our invention has relation to improvements in sprocket wheels and chains, especially applicable for transmitting power to various kinds of mechanisms.

The primary object of the invention is to overcome the great friction and wear to which the sprocket wheels and chains now in common use are subjected; and with this in view the invention consists of the devices and parts as herein described and claimed, or their equivalents.

In the accompanying drawings, Figure 1, is a side elevation of our improved wheel showing the chain applied thereto, and Fig. 2, is a central vertical sectional view of Fig. 1.

Like numerals of reference denote like parts in both figures of the drawings.

Referring to the drawings, the numeral 1 indicates a wheel provided with a central shaft aperture 2, and with a peripheral recess 3, said recess being formed by an annular flange 4, projecting from one edge of the periphery of the wheel, and a removable annular plate 5, secured by bolts 6, to the opposite side of the wheel. Arranged in the annular groove or recess thus formed is a series of anti-friction rollers 7, each of said rollers consisting of two disks fixedly mounted at distances apart upon a short shaft 8, thereby forming practically a grooved roller. The ends of the shafts 8 are journaled in suitable apertures 9, in the walls of the recess. The chain used in connection with this wheel consists of a series of links 10, having their ends bent into hook form, and a series of shorter rectangular links 11, connecting the adjacent hooks of links 10. It will be noticed that these latter links project laterally beyond the links 10, and pass into the recess of the wheel, being guided and confined between the walls of said recess and are adapted at their ends to contact with the anti-friction rollers on the sprocket-wheel, said rollers, therefore, having an analogous function to the function of the ordinary teeth of a sprocket wheel. The links 10, on the other hand, will pass into the grooves of the rollers 7, and the straight portions thereof will be in close proximity to, or in contact with, the axles of said rollers. The recess 3 is provided with the removable side wall or plate 5, in order to permit of the convenient insertion of the rolls 7. It is obvious that by merely taking out the bolts 6, the side plate can be removed, and the ends of the shafts of the pulleys placed in the journal apertures of the permanent wall of the recess, and the plate 5 readjusted in place for the reception of the other ends of the shaft, after which the bolts may be replaced. In adjusting the chain to the wheel, the hook sides of the links 10 are arranged adjacent to said wheel.

From the above description, it is thought that the operation, advantages, and construction of our improvement will be readily understood. It is of course apparent that the friction rollers 7 will come in contact with the links 11, and as the wheel revolves will themselves revolve on their axes as said links leave them, and thus overcome the rubbing and wear which would otherwise occur.

We do not wish to be understood as confining ourselves to the particular form of the link 10 herein shown and described, as this may be changed without departing from the spirit and scope of our invention, so long as it is of such form as to be readily admitted into the groove or recess of the anti-friction roller and is provided with suitable means for conveniently connecting its opposite ends to the links 11.

It will be seen that the peculiar form of the wheel, with the grooved rollers, is particularly although not necessarily adapted to a chain of the construction herein shown, inasmuch as the arrangement and construction of the anti-friction rollers, admit of the reception in their grooves of the links 10, and for the disposition between the peripheries of adjacent rollers of the links 11.

Having thus described our invention, what we claim, and desire to secure by Letters Patent of the United States, is—

1. In a sprocket-wheel and chain, the combination, of a wheel having a peripheral recess, peripherally grooved anti-friction rollers mounted at regular intervals in said recess, the journals for said rollers being located near the outer rim of said wheel, the anti-friction rollers being adapted to serve as teeth on the sprocket-wheel, in combination with a chain, the alternate links of which project laterally beyond the alternate intermediate connecting links, and are adapted at their ends to contact with the anti-friction rollers in the sprocket wheel, as with teeth thereon, and said alternate intermediate connecting links adapted to lie in the grooves or recesses of the anti-friction rollers, substantially as set forth.

2. A wheel having a recessed periphery, and grooved rollers mounted free to turn in said recess, substantially as set forth.

3. In a sprocket wheel and chain, the combination, of a wheel, peripherally grooved anti-friction rollers mounted peripherally at regular intervals in the wheel, said anti-friction rollers being adapted to serve as teeth on the sprocket wheel, in combination with a chain, the alternate links of which project laterally beyond the alternate intermediate connecting links, and are adapted at their ends to contact with the anti-friction rollers in the sprocket wheel, as with teeth thereon, and said alternate intermediate connecting links adapted to lie in the grooves or recesses of the anti-friction rollers, substantially as set forth.

4. In a sprocket wheel and chain, the combination, of a wheel having a peripheral recess, peripherally grooved anti-friction rollers mounted at regular intervals in the recess, said anti-friction rollers being adapted to serve as teeth on the sprocket wheel, in combination with a chain, the alternate links of which project laterally beyond the alternate intermediate links, and are adapted to pass into the peripheral recess of the wheel, and to be confined between the walls of said recess, and at their ends to contact with the anti-friction rollers of the sprocket wheels, as with teeth thereon, and said alternate intermediate links adapted to lie in the grooves or recesses of the anti-friction rollers, and provided at opposite ends with hooks engaging the other links, substantially as set forth.

In testimony whereof we affix our hands this 3d day of June, 1893.

JOHN B. GRUETER.
OSWALD JACKSON.

Witnesses:
WILLIS BROOKS,
H. H. MONTGOMERY.